United States Patent [19]

Nakai

[11] 4,109,782

[45] Aug. 29, 1978

[54] ACCUMULATING ROLLER CONVEYOR

[75] Inventor: Isao Nakai, Nagoya, Japan

[73] Assignee: Rain Kogyo Kabushiki Kaisha, Nagoya, Japan

[21] Appl. No.: 730,324

[22] Filed: Oct. 7, 1976

[30] Foreign Application Priority Data

Jun. 6, 1976 [JP] Japan .................................. 51-66360

[51] Int. Cl.² ............................................. B65G 13/07
[52] U.S. Cl. ..................................... 198/781; 198/782; 198/790
[58] Field of Search ................ 198/781, 782, 789, 790

[56] References Cited

U.S. PATENT DOCUMENTS

| | | | |
|---|---|---|---|
| 1,883,426 | 10/1932 | Walter et al. | 198/790 |
| 3,199,657 | 8/1965 | Harrison | 198/781 |
| 3,255,865 | 6/1966 | Sullivan | 198/781 |
| 3,313,399 | 4/1967 | De Good | 198/781 |
| 3,502,197 | 3/1970 | Kato et al. | 198/781 |
| 3,563,365 | 2/1971 | Loberg | 198/790 |
| 3,848,727 | 11/1974 | Gebhardt | 198/781 |
| 3,958,684 | 5/1976 | Garzelloni | 198/782 |

*Primary Examiner*—Evon C. Blunk
*Assistant Examiner*—James L. Rowland
*Attorney, Agent, or Firm*—Koda and Androlia

[57] ABSTRACT

An accumulating roller may be fabricated by driving a plurality of free rollers by means of a continuous belt which makes a frictional contact with the free rollers. Frictional contact between the belt and the free rollers may be enhanced by a plurality of pressure rollers disposed on the opposite side of the belt. Each end of the free rollers may be rotatably coupled to a frame by means of an eccentric linkage. The rotational coupling between the linkage and the frame is at a point which is offset and above the axis of rotation of each of the free rollers. The free roller rotates from a first position to a second position which is displaced somewhat above the first position. When displaced in the second position, the free roller makes insufficient frictional contact with the driving belt and substantially all rotational motion on the free rollers ceases.

4 Claims, 4 Drawing Figures

ACCUMULATING ROLLER CONVEYOR

BACKGROUND OF THE INVENTIONS

1. Field of the Invention

The present invention relates to the field of conveyors and in particular relates to accumulating roller conveyors having means for automatically disengaging and engaging the driving force from a momentarily stopped object on the conveyor.

2. Description of the Prior Art

In many applications it is desirable to selectively disengage certain numbers of rollers on a conveyor from the driving force when one or more objects, which are placed on the rollers are momentarily accumulated. At a selected moment, it is also desirable to re-engage the previously disengage rollers to a driving force to once again propel each accumulated or stopped object along the path of the conveyor. In the prior art, mechanisms for selectively engaging and disengaging rollers from a driving force to permit this accumulating operation, have been characterized by complex automatic hydraulic, electric and mechanical means. Typically, the operation of such means involves great expense, consumes a substantial amount of energy, may require additional control mechanisms beyond the basic propulsion means of the conveyor system, and tends to produce high noise levels. What is needed then, is an accumulating roller conveyor which is reliable, inexpensive, simply constructed and yet may selectively disengage and engage any number of rollers from a driving force according to the momentary passage or stoppage of objects upon the conveyor.

BRIEF SUMMARY OF THE INVENTION

The present invention is an accumulating roller conveyor which has overcome each of the drawbacks of the prior art in a simple and efficient manner. The operation of the present convention is particularly characterized by the ability to increase the transmission of the driving force which will be applied to the roller momentarily disposed beneath the moving object and automatically disengage the same roller when the object disposed on the roller has momentarily stopped. The motion or release of the object will automatically re-engage the previously disengaged roller to the driving force. Any number of a plurality of rollers may thus be selectively engaged and disengaged and such operation occurs without the production of high noise levels which are typical of prior art devices.

The present invention is a roller conveyor for conveying an object comprising: a frame; a plurality of free rollers having a first axis of rotation; linkage means for rotatably coupling each of the plurality of free rollers to the frame about a second axis of rotation, which second axis is substantially parallel to and offset from the first axis of rotation of each of the free rollers; and means for selectively imparting a rotary force to each of the free rollers disposed on the frame and functionally coupled to the plurality of free rollers. The present invention may further comprise stop means for selectively arresting motion of the object while the object is in contact with at least one of the three rollers.

More particularly, the present invention is an accumulating roller conveyor having a driving means for moving an object. The conveyor comprises a frame, a first plurality of rollers, a belt, and a second plurality of rollers. The first plurality of rollers each include means for permitting the corresponding roller to assume a first and second position which are vertically offset with respect to the other in relation to the frame. The belt is disposed beneath the first plurality of rollers and makes frictional contact with each of the first plurality of rollers. The belt is coupled to the driving means. The second plurality of rollers is disposed beneath the belt and is in frictional contact with the belt. The second plurality of rollers maintains the belt in sufficient frictional contact with the first plurality of rollers to impart a rotary force and motion to at least one of the first plurality of rollers when the corresponding roller is in its first position. The first plurality of rollers are substantially free of rotary motion when displaced upward into the second position. Stoppage of the object imparts a force on selected ones of the first plurality of rollers to displace these selected rollers into the second position. Further aspects and advantages of the present invention and its various embodiments may be appreciated by reviewing the detailed description in connection with FIGS. 1–4.

DETAILED DESCRIPTION OF THE PREFERRED EMBODIMENT

The present invention is a conveyor which automatically disengages and engages the selected portion of the conveyor system according to the momentary stoppage and release of objects placed upon the conveyor. In particular, the present invention is an accumulating roller conveyor wherein the object is placed on a first plurality of rollers 12 or free rollers 12 which are rotatably coupled to a frame 10. The free rollers may be disposed in a first and second position. In the first position the free rollers are subjected to a frictional force which causes the free roller to rotate thereby imparting a linear momentum to the object disposed on the free rollers. When in the second position the free rollers may be subject to a lessened frictional contact and may be stopped or substantially free of rotary motion. The stoppage of an object placed upon the free roller automatically displaces the free roller to the second position. The frictional force imparted to the free roller is lessened and consequently the linear force applied to the stopped object decreases. The free roller 12 is automatically disposed to the first position when or soon after the object disposed thereon is again permitted to move. The details of the present invention in its various embodiments may be better understood by viewing FIGS. 1–4.

Figure 1:
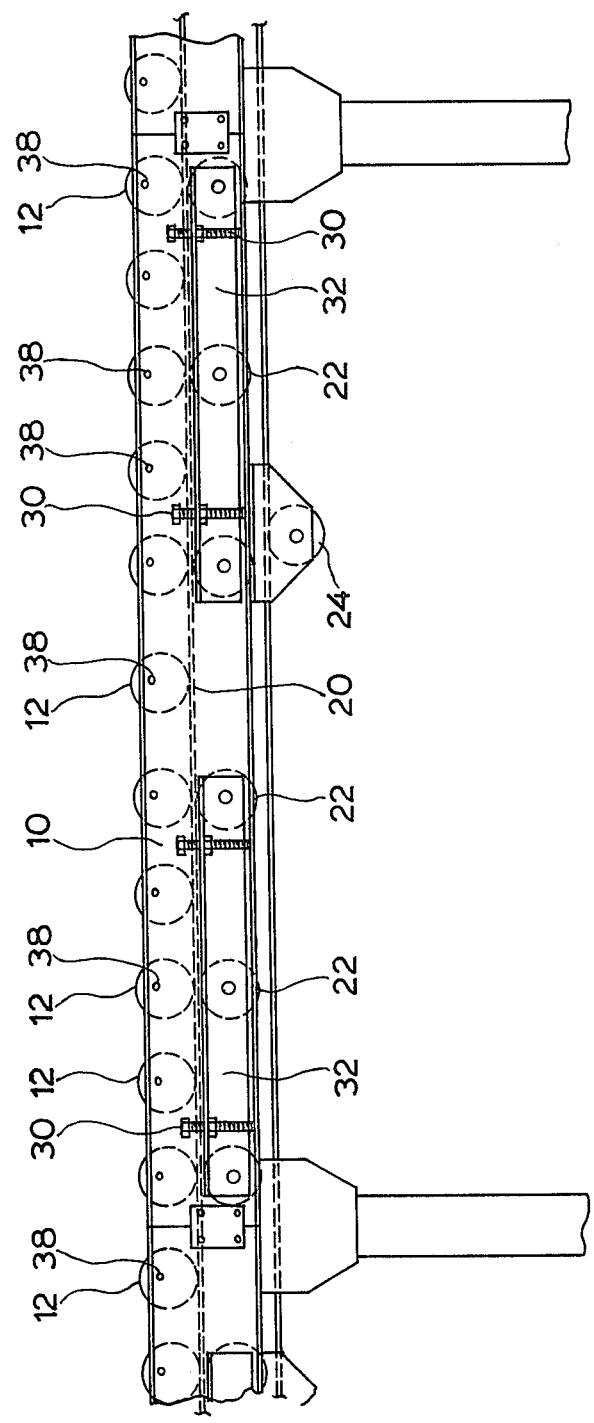
FIG. 1 is a simplified side view showing many of the principal elements of the present invention.

In FIG. 1 a simplified side view, of one embodiment of the present invention is illustrated wherein the plurality of free rollers 12 are shown as rotatably coupled to frame 10. Frame 10 as shown in an end view in FIG. 2 includes two side members 14 and 16. Typically, a first plurality of free rollers is rotatably coupled to frame 10 by a linkage means which in one embodiment may include an eccentric linkage means. A driving belt 20, typically continuous belt, is disposed beneath free roller 12 and makes frictional contact therewith. The opposing side of the driving belt may be disposed on a second plurality of rollers or pressure rollers 22. Continuous belt 20 may be supported on its return path by a third plurality of rollers 24.

Figure 3:
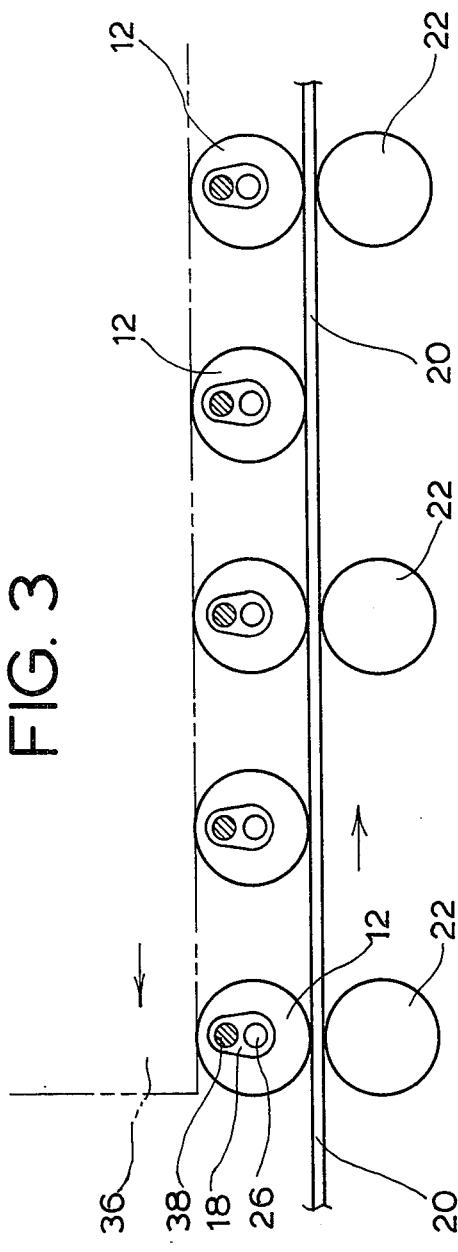
FIG. 3 is a simplified diagram illustrating the operation of the present invention when the free rollers are in the first position.
Figure 4:
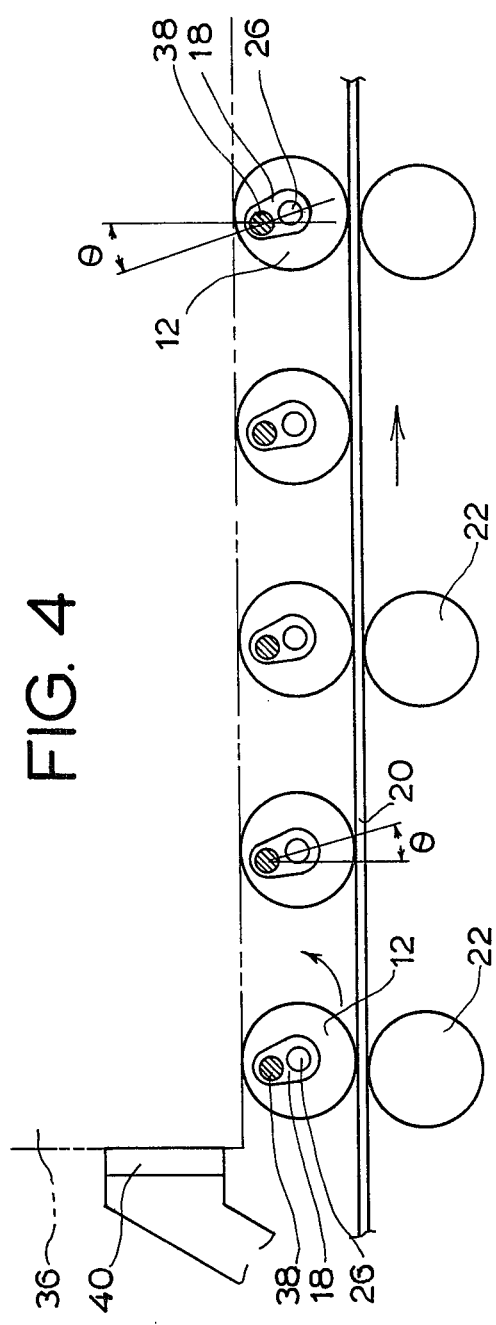
FIG. 4 of the present invention is a simplified diagramatic side view showing the operation when the free rollers are displaced into the second position.

The object or goods which are to be conveyed are disposed on the upper portion of free rollers 12 as shown in FIG. 3 and 4. Each free roller 12 may be coupled to frame 10 by pins or shafts 26 which are aligned along the axis of rotation or the axis of symmetry of free rollers 12. In the illustrated embodiment, each end of free roller 12 is provided with pin 26, although it is entirely within the scope of the present invention that each end of free rollers 12 or pressure rollers 22 may be provided with different rotatable couplings well known to the art. In the embodiment illustrated, pin 26 is rotatably coupled at one end of eccentric linkage 18. The opposing end of eccentric linkage 18 is rotatably coupled to frame 10. Thus, free roller 12 may assume a first position which is at or near the lowest displacement of free roller 12, as allowed by the rotation of eccentric linkages 18. Free roller 12 may also assume a second position which may be any position which is vertically displaced from the first position as permitted by the rotation of eccentric linkages 18. It is to be understood, however, that linkages 18 are shown by way of illustration only, and that it is to be understood that any equivalent means well known to the art is within the scope of the present invention.

Figure 2:
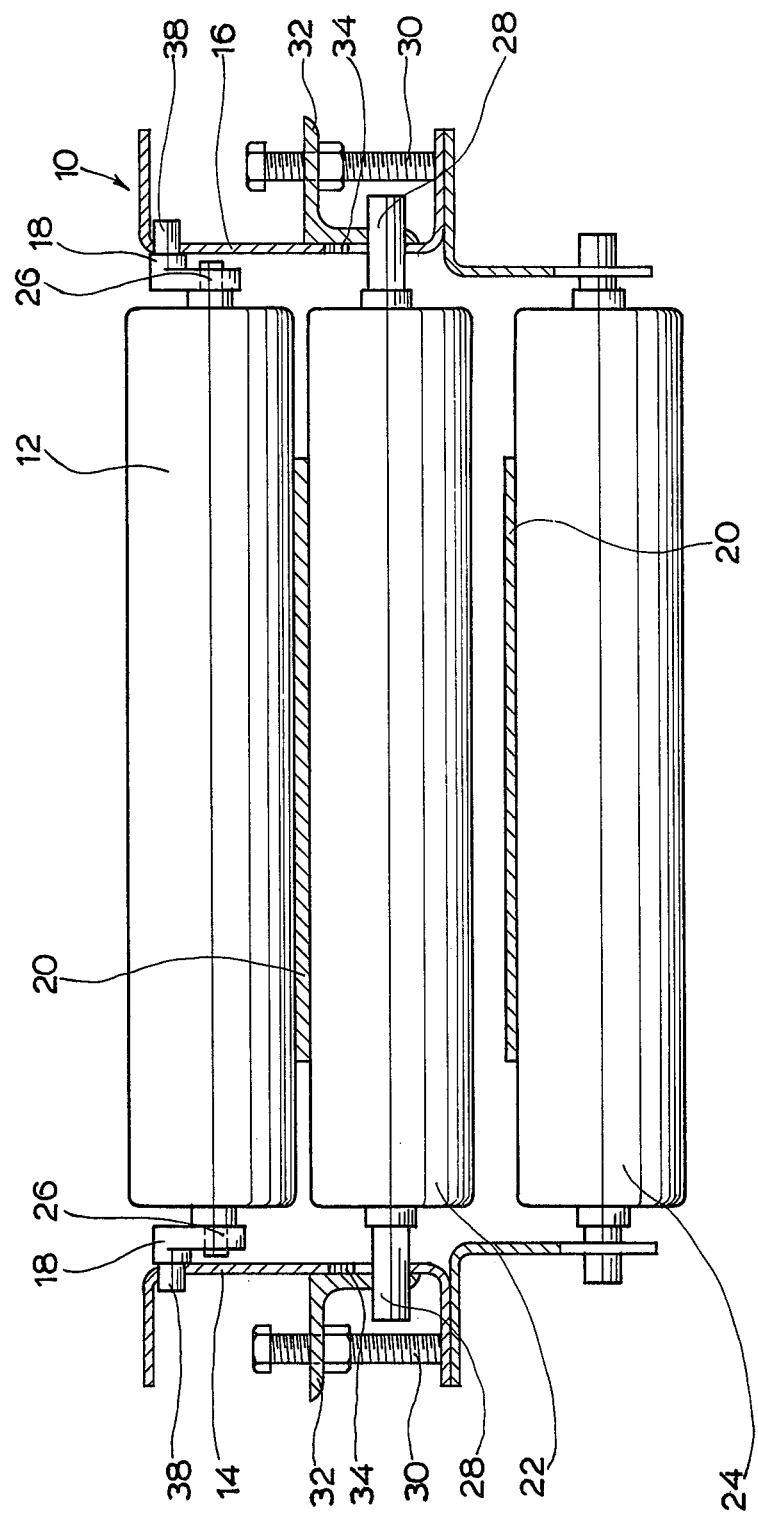
FIG. 2 is an end view showing the driving belt sandwiched between a free roller and pressure roller together with the return portion of the driving belt as supported by a guide roller.

Pressure rollers 22 are disposed beneath the free rollers 12 and are rotatably coupled to frame 10 by means of a pin or shaft 28. Pins 28 may be aligned along the axis of rotation or axis of symmetry of pressure rollers 22. As shown in each of the Figures, and in particular, FIG. 2, pressure roller 22 maintains frictional contact with the underside of driving belt 20 is in frictional contact with free roller 12. FIGS. 2 and 3 show pressure rollers 22 as positioned directly below a corresponding free roller 12. However, pressure rollers 22 may be disposed anywhere along the underside of belt 20 and need not be aligned with the overlying free rollers 12.

Pressure roller 22 may be used to regulate the pressure or the amount of frictional force which is imparted by driving belt 20 to free roller 12. It is well known that the tangential frictional force between two objects is directly proportional to the normal force between the objects. Thus, if driving belt 20 is pressed with greater force against free roller 12, a greater tangential frictional force may be imparted to free roller 12.

The vertical displacement of pressure roller 22 with respect to frame 10 may be selectively fixed by means of a regulating screw 30 and movable bracket 32. One end of regulating screw 30 may be threaded through a hole defined in movable bracket 32. The opposing end of regulating screw 30 may be disposed against the lower portion of the respective side member 14 or 16. By proper adjustment of regulating screw 30, the height of movable bracket 32 with respect to side member 14 or 16 may be fixed. Movable bracket 32 may be slideably engaged to side member 14 and 16 by any means well known to the art, including end brackets, slots and bolts, and their equivalents. As shown in FIG. 1, in one embodiment, movable bracket 32 may be coupled to three pressure rollers and have its vertical displacement fixed by two regulating screws 30. Any arrangement and configuration of movable bracket 32 together regulating screws 30 and pressure rollers 22 may be employed, and the particular embodiment shown in FIGS. 1 and 2 is for the purpose of illustration only. Any means which is capable of rotatably engaging pressure rollers 22 and disposing pressure roller 22 and frame 10 at a selected vertical position may be employed. A slot 34 may be provided in side members 14 and 16 to permit vertical motion of pins 28 relative their respective side members.

Therefore, as pressure roller 22 is displaced upward as described, the degree of forcing parted by pressure roller 22 to the underside of driving belt 20 is increased. Similarly, the degree of force between the upper side of driving belt 20 and free roller 12 is increased. Similarly, downward displacement of pressure roller 22 will decrease the amount of frictional force between driving belt 20 and free roller 12.

Finally, guide roller 24 may be provided at selected positions below pressure rollers 22 as illustrated in FIG. 1 and 2 to support the returning portion of driving belt 20. Inclusion of guide roller 24, their numbers and placements are determined by the particular application at hand, i.e. the length of the run, the tension on the belt, the speed of the belt and similar factors well known to the arts.

It is also to be expressly understood that means (not shown) for driving belt 20 may also be provided. Such means may any well known mechanical, hydraulic, automatic or mechanical means for imparting motion to a belt or continuous belt. Typically, such a means includes an electric motor coupled to a driving roller and appropriate belt tensioning elements well known to the art. The operation of present invention may better understood by viewing the simplified diagramatic illustrations of FIGS. 3 and 4.

FIG. 3 is a simplified diagramatic view, showing for the purposes of clarity only, eccentric linkage 18, free roller 12, belt 20 and pressure roller 22. An object 36 is disposed on the upper surface of a selected plurality of free rollers 12. Typically, object 36 is a box, crate, or other similar carrier or holder. In the illustration of FIG. 3, belt 20 has its upper loop translated from left to right. It is to be understood that when belt 20 is a continous loop there will be a lower loop displosed beneath pressure rollers 22 which will be translated by an appropriate means in the opposite direction. When object 36 is moving, each of the plurality of free rollers 12 will disposed in a first position wherein eccentric linkage 18 is arranged such that a line drawn to pin 26 of free roller 12 and pin 38 of eccentric linkage 18 will lie substantially along the vertical. Frictional force applied by the upper surface of the belt to the bottom surface of free roller 12 will impart a rotary motion to free roller 12 which will be transmitted as a translational force from free roller 12 to object 36, thus conveying object 36 from the right to left. In addition, when eccentric linkage 18 has pin 38 disposed in a vertically aligned slot, object 36 will displace or tend to displace free roller 12 to the lower extremity of such a slot and thereby increase the amount of frictional force transmitted between free roller 12 and belt 20. Pin 38 of eccentric linkage 18 is shown in a side view in FIG. 2 and may be formed as an integral extension of eccentric linkage 18, which is rotatably coupled to a receiving hole formed in frame 10.

Thus in the embodiment showing FIG. 3 the axis of rotation of free roller 12 is substantially aligned to the axis of rotation of pressure roller 22 in those cases where pressure roller 22 is positioned next to free roller 12. In such cases pressure roller 22 may help support the corresponding free roller 12. Thus, driving belt 20 successfully delivers rotational force to free roller 12 and imparts a translational force to object 36 to displace the object in a direction opposite to which belt 20 is moving.

In FIG. 4 stop means 40 is shown as disposed in the line of travel of object 36. Stop means 40 may be any means well known to the art which may be momentarily disposed in the path of the travelling object placed on the roller conveyor. In the embodiment shown stop means 40 is a movable arm which may be selectively disposed above the upper plane of free rollers 12 and in the path of displacement of object 36. Object 36 progresses until impacting stop means 40 and is held in a selected position according to the position of stop means 40. It is to be understood however, that when a plurality of objects 36 are conveyed on the roller conveyor of the present invention, the stop means for one object may be the proceeding object. Thus, stop means 40 include any physical object or obstruction which can directly or indirectly arrest the motion of object 36.

When object 36 is stopped, driving belt 20 continues to move. In the embodiment of FIG. 4, the upper loop of a continuous driving belt 20 is moving from left to right thereby continuing to impart a frictional force upon the lower portions of free rollers 12. However, rotation of free rollers 12 is resisted by an opposing frictional force applied to each of the free rollers which is in contact with the stopped object 36. Due to the fact that pin 38 is offset and disposed above pin 26 a net torque is applied to each free roller 12 and eccentric linkage 18, thereby rotating eccentric linkage 18 in a counterclockwise direction as illustrated in FIG. 4. Free rollers 12 continue to rotate in a counterclockwise direction until the lines to the center pins 38 and 26 make an angle, with respect to the vertical. At this angle, as empirically determined, free roller 12 is displaced upward and away from the upper surface of belt 20 to such an extend that the normal force between the surface of free roller 12 and the upper surface of belt 20 has decreased to a predetermined magnitude. At this point, the torque applied about the center of pin 38 of each free roller 12 exactly equals the opposite torque about pin 38 exerted on each free roller 12 by gravity. Each of the free rollers 12 inclined at angle will remain at this equilibrium position as long as object 36 overlying the corresponding free rollers 12 remains motionless. It is important to note that the translational force applied to object 36 when stop means 40 is in place is substantially zero. The normal force between driving belt 20 and rotated free roller 12 is decreased, such that the frictional force is tending to rotate the roller is decreased. The roller is substantially stationary. Thus, object 36 has a diminished translational force applied to it.

When stop means 40 is selectively removed, the torque about pin 38 will substantially decrease since each free roller 12 will now be permitted to rotate by displacing the overlying object 36. As the torque about pin 38 imparted by belt 20 decreases, the gravitational torque about pin 38 will return each of the free rollers to the first position as illustrated in FIG. 3. Thus a full translational force will then be reapplied to object 36 and the degree of normal force between the upper surface of belt 20 and free rollers 12 will reassume the initial maximum magnitude.

One of the particular advantages of the present invention is the automatic engagement and disengagement of force from the conveyed object in a smooth and easy manner without the creation of high noise levels typical of prior art mechanisms. Furthermore, the roller conveyor of the present invention may be operated in either direction, merely by reversing the direction of translation of driving belt 20, without the incorporation of any special design or activation of any additional mechanism. The operation of the present invention is exactly the same whether the conveyor runs from left to right as shown in FIG. 3 and 4 or from right to left.

Furthermore, by constructing vertical slots in frame 10 for either pin 38 of eccentric linkage 18 or pin 26 of free roller 12 in eccentric linkage 18, the free roller may be adapted to move upward or downward relative to frame 10. The flexibility of upward and downward motion of free roller 12 may enhance the engagement and disengagement of force from free rollers 12 to object 36.

The present invention has many advantages including those explained above. The movement and stoppage of conveyed goods can be effected very smoothly and easily by changing the position of free rollers 12 by means of a very simple construction in which free roller 12 is suspended by means of a freely eccentric linkage 18. Since the position of free roller 12 is determined by the rotational movement and position of eccentric linkage 18, there is no impact between the parts or various fittings of the present invention. Therefore mechanical noise created during the carrying, stopping and starting of the conveyed goods, which has always been a problem with a device of this sort, is substantially reduced. In addition, the reliability and simplicity of the present invention has been increased by reducing the number of parts, and utilizing a simple construction to decrease the expense of an automatically self-actuating, accumulating roller conveyor.

Although the present invention has been described in terms of the specific embodiments shown in FIGS. 1-4, it is to be understood that many modifications and alterations may be made in the illustrated embodiments by those having ordinary skill in the art without departing from the spirit and scope of the present invention.

I claim:

1. a roller conveyor for conveying an object comprising:
    a frame;
    a plurality of free rollers having a first axis of rotation;
    a first pin aligned along said first axis of rotation and extending from each end of each free roller;
    linkage means rotatably coupled each of said plurality of free rollers to said frame about a second axis of rotation substantially parallel and offset from said first axis of rotation of said free rollers and located between said first axis and said object, said linkage means including an eccentric member having one end rotatably coupled to said first pin and the other end of said eccentric member formed into a second pin aligned along said second axis of rotation and rotatably coupled to said frame; and
    means for selectively imparting rotational force to each of said free rollers disposed on said frame, said means frictionally coupled to said plurality of free rollers.

2. The conveyor claim 1 further comprising:
stop means for selectively arresting motion of said object while said object is in contact with at least one of said free rollers.

3. The conveyor of claim 1 wherein said means for selectively imparting a rotary force to each of said free rollers includes:
a continuous belt having a first surface in contact with each of said free rollers at least when said belt drives said free rollers;

a plurality of pressure rollers, each pressure roller rotatably coupled to said frame and in contact with a second surface of said continuous belt, said second surface opposing said first surface of said continuous belt; and means for moving said belt in contact with said free rollers and pressure roller.

4. The conveyor of claim 3 further comprising means for adjusting frictional contact between said pressure rollers, free rollers and said belt.

* * * * *